(12) United States Patent
Harris

(10) Patent No.: US 11,124,222 B2
(45) Date of Patent: Sep. 21, 2021

(54) CAMMING DRIVE PULLEY FOR ELECTRIC POWER STEERING SYSTEM

(71) Applicant: Steering Solutions IP Holding Corporation, Saginaw, MI (US)

(72) Inventor: Ryan D. Harris, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 182 days.

(21) Appl. No.: 16/582,794

(22) Filed: Sep. 25, 2019

(65) Prior Publication Data
US 2021/0086823 A1   Mar. 25, 2021

(51) Int. Cl.
*B62D 5/04* (2006.01)
*B62D 3/12* (2006.01)

(52) U.S. Cl.
CPC ......... *B62D 5/0442* (2013.01); *B62D 5/0424* (2013.01); *B62D 3/12* (2013.01)

(58) Field of Classification Search
CPC ...... B62D 5/0442; B62D 5/0424; B62D 3/12; Y10T 74/18848
See application file for complete search history.

(56) References Cited

U.S. PATENT DOCUMENTS

| | | | |
|---|---|---|---|
| 10,995,799 B2 * | 5/2021 | Douglas | F16H 55/36 |
| 2006/0183583 A1 * | 8/2006 | Sakaida | B62D 5/0424 474/70 |
| 2007/0102230 A1 * | 5/2007 | Namgung | B62D 5/0424 180/444 |
| 2017/0029017 A1 * | 2/2017 | Pattok | B62D 5/0448 |
| 2018/0118252 A1 * | 5/2018 | Kondo | B62D 5/0424 |
| 2019/0375448 A1 * | 12/2019 | Harris | B62D 1/163 |

* cited by examiner

*Primary Examiner* — Tony H Winner
(74) *Attorney, Agent, or Firm* — Dickinson Wright PLLC

(57) ABSTRACT

A power steering system includes a rack housing arranged to receive a longitudinally displaceable rack member. The system also includes an assist cover connected to the rack housing, the rack housing and the assist cover defining a cavity. The system further includes an assist assembly at least partially disposed within the cavity. The assist assembly includes a power pack connected to the rack housing, the power pack having a power pack shaft extending therefrom. The assist assembly also includes a drive pulley coupled to the power pack shaft. The assist assembly further includes a single bearing disposed within a bore defined by the drive pulley. The assist assembly yet further includes a mechanical fastener coupling the drive pulley to the assist cover. The assist assembly also includes a driven pulley disposed about the rack member.

16 Claims, 2 Drawing Sheets

CAMMING DRIVE PULLEY FOR ELECTRIC POWER STEERING SYSTEM

FIELD OF THE INVENTION

The embodiments disclosed herein relates to power steering systems and, more particularly, to an electric power steering camming drive pulley.

BACKGROUND

A power steering system may be provided with a power steering mechanism that is movably positioned relative to a housing during an assembly process. The power steering mechanism is movably positioned to enable other assembly processes to occur prior to final assembly. Upon completion of the other assembly processes, the power steering mechanism is finally positioned relative to the housing. Servicing of the power steering mechanism may vary the tension or the engagement between other components of the power steering system that may influence performance of the power steering system.

Prior systems include two toothed pulleys and one smooth idler wheel combined with a synchronous belt. The drive pulley and the driven pulley spacing is fixed within the rack housing so the idler wheel contains a camming device to adjust belt tension. Once the desired belt tension is achieved, the idler cam is locked in position with a threaded fastener. The drive pulley has a female spline that engages a male spline on the power pack motor shaft. However, the reverse configuration is contemplated. The drive pulley is supported radially on both ends in the rack housing with ball bearings. The ball bearings are press fit to the drive pulley and the bearing closest to the pinion is retained axially to the housing between a bearing bore and a beveled retaining ring. The above-described system allows for the factory set belt tension to remain unchanged in the event the power pack is replaced during a service operation.

The prior systems require an additional component, specifically the idler cam/pulley, to allow for adjustment of belt tension. The prior systems remove the possibility of motor shaft tilt induced belt drive misalignment, but is subject to misalignment due to bearing bore offsets. The drive pulley design requires two bearings, which means each bearing has an excess load capacity.

SUMMARY

According to one aspect of the disclosure, a power steering system includes a rack housing arranged to receive a longitudinally displaceable rack member. The system also includes an assist cover connected to the rack housing, the rack housing and the assist cover defining a cavity. The system further includes an assist assembly at least partially disposed within the cavity. The assist assembly includes a power pack connected to the rack housing, the power pack having a power pack shaft extending therefrom. The assist assembly also includes a drive pulley coupled to the power pack shaft. The assist assembly further includes a single bearing disposed within a bore defined by the drive pulley. The assist assembly yet further includes a mechanical fastener coupling the drive pulley to the assist cover. The assist assembly also includes a driven pulley disposed about the rack member.

According to another aspect of the disclosure, a power steering system assist assembly disposed within a cavity defined by a rack housing and an assist cover is provided. The assist assembly includes a power pack connected to the rack housing, the power pack having a power pack shaft extending therefrom. The assist assembly also includes a drive pulley coupled to the power pack shaft. The assist assembly further includes a bearing disposed within a bore defined by the drive pulley. The assist assembly yet further includes a mechanical fastener coupling the drive pulley to the assist cover, wherein the bore of the drive pulley includes a central axis and the mechanical fastener includes a fastener axis, wherein the central axis is offset from the fastener axis.

These and other advantages and features will become more apparent from the following description taken in conjunction with the drawings.

BRIEF DESCRIPTION OF THE DRAWINGS

The subject matter that is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, the present disclosure will be described with reference to specific embodiments, without limiting same. It is to be understood that the disclosed embodiments are merely exemplary of the present disclosure that is embodied in various and alternative forms. The Figures are not necessarily to scale, as some features may be exaggerated or minimized to show details of particular components. Therefore, specific structural and functional details disclosed herein are not to be interpreted as limiting, but merely as a representative basis for teaching one skilled in the art to employ the present disclosure.

Figure 1:
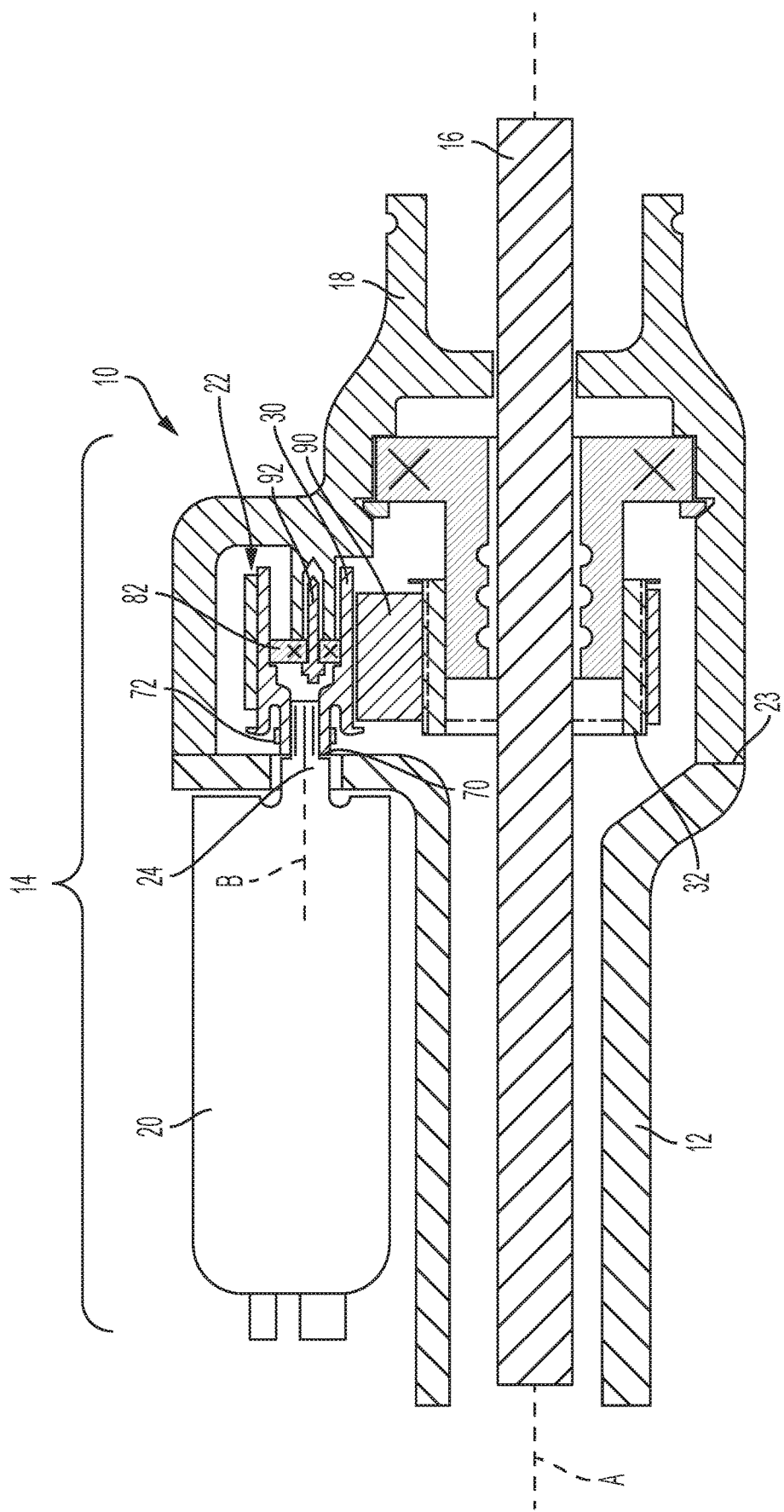
FIG. 1 is a cross-sectional view of a portion of a power steering system according to an aspect of the disclosure.

Referring to FIG. 1, illustrated is a power steering system 10, such as an electric power steering system, which may be used in conjunction with a motor vehicle. The power steering system 10 includes a rack housing 12 and a power steering assist system 14. A longitudinally displaceable rack member 16 at least partially extends through the rack housing 12. The rack member 16 is operatively connected to a driven pulley 32 to facilitate translation or displacement along a longitudinal axis A relative to the rack housing 12 to facilitate the pivoting of at least one vehicle wheel (not shown).

The power steering assist system 14 may include an assist cover 18, a power pack 20, and an assist assembly 22. The assist cover 18 may be operatively connected to an end 23 of the rack housing 12. At least a portion of the rack housing 12 may extend into and/or through the assist cover 18. The assist assembly 22 may be disposed within a cavity that is defined between portions of the assist cover 18 and the rack housing 12. The assist cover 18 may include a plurality of features to rotatably support components of the assist assembly 22 and/or the rack member 16.

The power pack 20 may be operatively connected to a portion of the rack housing 12, as shown in FIG. 1, or the power pack 20 may be operatively connected to a portion of the assist cover 18 in other embodiments. The power pack 20 may include an electric motor or the like that is disposed within a motor housing. The power pack 20 may also include a power pack motor shaft 24 that extends from the power pack 20 along an axis B that is disposed parallel to, but not coaxial with, the longitudinal axis A along which the rack member 16 extends.

The power pack motor shaft 24 is coupled to a drive pulley 30 in a splined manner to facilitate the transfer of motor shaft torque from the power pack motor shaft 24 to the drive pulley 30. The power pack motor shaft 24 is inserted into a hollow end of the drive pulley 30 and is coupled thereto in a splined or mechanically fastened manner.

The assist assembly 22 may be arranged to apply an assist force from the power pack 20 to the rack member 16 to facilitate the pivoting articulation of at least one vehicle wheel. The assist assembly 22 includes the drive pulley 30 and the driven pulley 32, such that the assist assembly 22 is a belt drive system. However, an idler (or idler pulley) is notably absent from the embodiments of the overall assembly disclosed herein. The driven pulley 32 is disposed about the rack member 16. The steering assist force may be transferred from the drive pulley 30 to the driven pulley 32 through a belt 90 that extends about the drive pulley 30 and the driven pulley 32.

Figure 2:
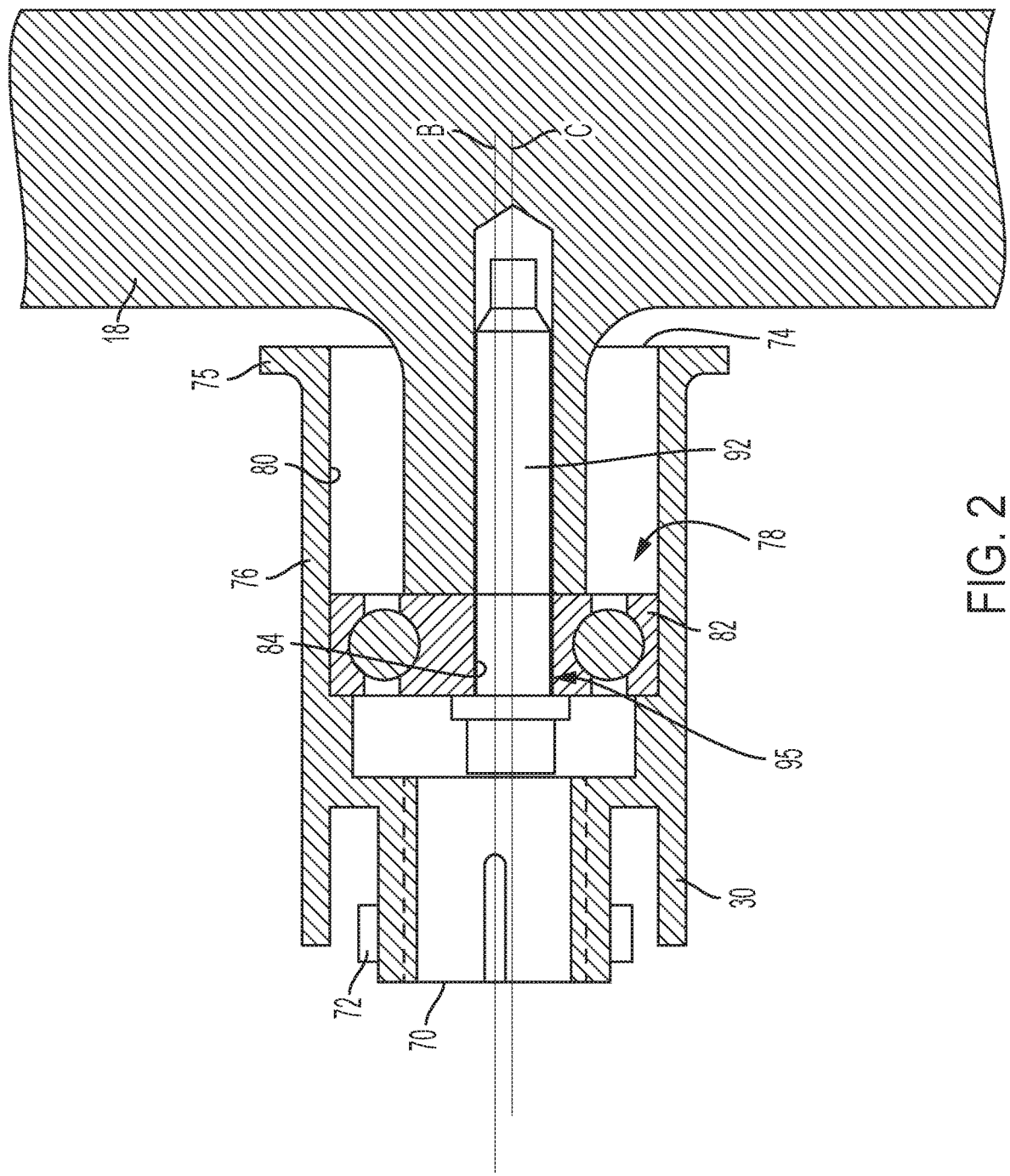
FIG. 2 is an elevational schematic view of a drive pulley of the power steering system.

Referring now to FIGS. 1 and 2, the drive pulley 30 is shown in greater detail in FIG. 2. The drive pulley 30 is referred to herein as a camming drive pulley. The drive pulley 30 is plastic in some embodiments, but alternative materials such as metal may be employed to form the drive pulley 30 in other embodiments. A first end 70 of the drive pulley 30 contains a split female spline compressed radially with a steel band 72 and is configured to receive a male spline portion of the power pack motor shaft 24 to form the splined coupling described above for the transfer to torque from the motor shaft 24 to the drive pulley 30 (FIG. 1). A second end 74 of the drive pulley 30 contains a molded flange 75 extending radially from an outer diameter 76 and defines a bearing bore 78 with an inner diameter 80. A bearing 82 is pressed into the bearing bore 78 of the drive pulley 30 and includes a cam disc integrated on an inner surface 84 thereof to allow for tensioning of a belt 90 that extends about the drive pulley 30 and the driven pulley 32. The bearing cam disc is fastened to the assist cover 18 with a threaded fastener 92.

As shown more clearly in FIG. 2, a central axis B of the bearing bore 78 of the drive pulley 30 is offset from an axis C of a bearing aperture 95 that the threaded fastener 92 that is disposed within. In other words, the aperture 95 of the bearing is not centralized. The offset relationship between the bearing aperture axis C and the bearing bore axis B maintains the desired belt tensioning. The degree to which the axes B, C are offset may vary depending upon the particular application of use. In some embodiments, the offset is at least 0.25 millimeters. In such an embodiment, 0.5 millimeters of total radial movement is permitted. Regardless of the extent of the offset, it is to be understood that the offset is intentional and calculated and is not attributed to manufacturing processes or tolerances.

The embodiments disclosed herein eliminates the idler that adds cost and friction to the belt drive. Additionally, since only one ball bearing is used with the drive pulley 30, the drive pulley is able to pivot around this bearing and self-align to the driven pulley 32.

In other power pack systems, the belt tension may be reset after a power pack service procedure in which the power pack is removed. The resetting of the belt tension may lead to an inappropriately adjusted belt tension that may diminish assist loads or may increase system friction.

The embodiments disclosed herein facilitate the belt tension to retain or maintain its original factory setting and minimize belt tension variation even during servicing in which the power pack 20 is removed.

The embodiments disclosed herein also separate the power pack 20 from the belt tensioning process, when compared to other power pack systems. The separation of the power pack 20 from the belt tensioning process enables a service technician to only remove the old power pack, clean the sealing surface, and attach the new power pack to at least one of the rack housing 12 or the assist cover 18. Therefore, a service technician may be inhibited from altering the factory belt tension setting and the system friction and durability functions are protected.

Assembly of the power steering system 10 is also improved by enabling the belt tensioning to be performed prior to the installation of the power pack 20 and/or the assist cover 18. The pre-tensioning simplifies the assembly process of the power steering system 10 while inhibiting changes to the belt tension after installation of the power pack 20.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the invention, it is claimed:

1. A power steering system comprising:
a rack housing arranged to receive a longitudinally displaceable rack member;
an assist cover connected to the rack housing, the rack housing and the assist cover defining a cavity; and
an assist assembly at least partially disposed within the cavity, the assist assembly comprising:
a power pack connected to the rack housing, the power pack having a power pack shaft extending therefrom;
a drive pulley coupled to the power pack shaft;
a single bearing disposed within a bore defined by the drive pulley;
a mechanical fastener coupling the drive pulley to the assist cover; and
a driven pulley disposed about the rack member.

2. The power steering system of claim 1, wherein the bore of the drive pulley includes a central axis and the mechanical fastener includes a fastener axis, wherein the central axis is offset from the fastener axis.

3. The power steering system of claim 2, wherein the central axis is offset from the fastener axis by at least 0.25 millimeters.

4. The power steering system of claim 1, wherein the drive pulley is coupled to the power pack shaft with a spline coupling.

5. The power steering system of claim 4, wherein the drive pulley includes an aperture at an end of the drive pulley with female splines and the power pack shaft includes male splines that engage the female splines of the drive pulley.

6. The power steering system of claim 4, wherein the drive pulley includes male splines and the power pack shaft includes female splines.

7. The power steering system of claim 1, wherein the drive pulley is formed of plastic.

8. The power steering system of claim 1, wherein the drive pulley is formed of metal.

9. A power steering system assist assembly disposed within a cavity defined by a rack housing and an assist cover, the assist assembly comprising:
   a power pack connected to the rack housing, the power pack having a power pack shaft extending therefrom;
   a drive pulley coupled to the power pack shaft;
   a bearing disposed within a bore defined by the drive pulley; and
   a mechanical fastener coupling the drive pulley to the assist cover, wherein the bore of the drive pulley includes a central axis and the mechanical fastener includes a fastener axis, wherein the central axis is offset from the fastener axis.

10. The assembly of claim 9, wherein the assembly consists of a single bearing in contact with the drive pulley.

11. The assembly of claim 9, wherein the central axis is offset from the fastener axis by at least 0.25 millimeters.

12. The assembly of claim 9, wherein the drive pulley is coupled to the power pack shaft with a spline coupling.

13. The assembly of claim 12, wherein the drive pulley includes an aperture at an end of the drive pulley with female splines and the power pack shaft includes male splines that engage the female splines of the drive pulley.

14. The assembly of claim 12, wherein the drive pulley includes male splines and the power pack shaft includes female splines.

15. The assembly of claim 9, wherein the drive pulley is formed of plastic.

16. The assembly of claim 9, wherein the drive pulley is formed of metal.

* * * * *